US010162210B2

(12) United States Patent
Zou

(10) Patent No.: US 10,162,210 B2
(45) Date of Patent: Dec. 25, 2018

(54) TOUCH PANEL AND METHOD OF PRODUCING THE SAME, DISPLAY APPARATUS

(71) Applicant: BOE TECHNOLOGY GROUP CO., LTD., Beijing (CN)

(72) Inventor: Xiangxiang Zou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 372 days.

(21) Appl. No.: 14/771,424

(22) PCT Filed: Oct. 28, 2014

(86) PCT No.: PCT/CN2014/089671
§ 371 (c)(1),
(2) Date: Aug. 28, 2015

(87) PCT Pub. No.: WO2016/023273
PCT Pub. Date: Feb. 18, 2016

(65) Prior Publication Data
US 2016/0363808 A1 Dec. 15, 2016

(30) Foreign Application Priority Data
Aug. 11, 2014 (CN) .......................... 2014 1 0392069

(51) Int. Cl.
*G02F 1/1335* (2006.01)
*G02F 1/1343* (2006.01)
(Continued)

(52) U.S. Cl.
CPC ...... *G02F 1/133512* (2013.01); *G02F 1/1368* (2013.01); *G02F 1/13338* (2013.01);
(Continued)

(58) Field of Classification Search
None
See application file for complete search history.

(56) References Cited

U.S. PATENT DOCUMENTS 4,972,248 A * 11/1990 Kornreich ........... H01L 27/0688
257/14
2012/0274603 A1* 11/2012 Kim ...................... G06F 3/0412
345/174
(Continued)

FOREIGN PATENT DOCUMENTS

CN 103049156 A * 4/2013 ........... G06F 3/0412
CN 103278955 A 9/2013
(Continued)

OTHER PUBLICATIONS

International Search Report and Written Opinion from PCT Application Serial No. PCT/CN2014/089671 with partial translation, dated May 8, 2015, 10 pages.
(Continued)

*Primary Examiner* — Edward Glick
*Assistant Examiner* — Anthony G Quash
(74) *Attorney, Agent, or Firm* — Kinney & Lange, P.A.

(57) ABSTRACT

The present disclosure provides a touch panel, a method for producing the same and a display apparatus. The touch panel includes: a first substrate, a second substrate opposed to the first substrate, a display medium layer between the first substrate and the second substrate, a black matrix arranged on one of the first substrate and the second substrate, a plurality of driving electrode units and a plurality of inductive electrode units arranged alternatively on the other one of the first substrate and the second substrate, and each of the plurality of driving electrode units or the plurality of inductive electrode units includes a plurality of transparent electrodes and projections of boundaries of the transparent
(Continued)

electrodes onto the substrate having the black matrix are covered by the black matrix or coincide with the range of the black matrix.

17 Claims, 6 Drawing Sheets

(51) Int. Cl.
    *G02F 1/1362*     (2006.01)
    *G02F 1/1333*     (2006.01)
    *G06F 3/041*     (2006.01)
    *G06F 3/044*     (2006.01)
    *G02F 1/1368*     (2006.01)

(52) U.S. Cl.
    CPC .... *G02F 1/13439* (2013.01); *G02F 1/133345* (2013.01); *G02F 1/133514* (2013.01); *G02F 1/134309* (2013.01); *G02F 1/136286* (2013.01); *G06F 3/044* (2013.01); *G06F 3/0412* (2013.01); *G06F 3/0416* (2013.01); *G02F 2201/121* (2013.01); *G02F 2201/122* (2013.01); *G02F 2201/123* (2013.01); *G06F 2203/04103* (2013.01); *G06F 2203/04107* (2013.01); *G06F 2203/04111* (2013.01)

(56) References Cited

U.S. PATENT DOCUMENTS

| | | | | |
|---|---|---|---|---|
| 2014/0168540 | A1* | 6/2014 | Wang | G06F 3/0412 349/12 |
| 2015/0062457 | A1* | 3/2015 | Kida | G06F 3/044 349/12 |

FOREIGN PATENT DOCUMENTS

| | | |
|---|---|---|
| CN | 103294273 A | 9/2013 |
| CN | 103472951 A | 12/2013 |
| CN | 103838430 A | 6/2014 |
| CN | 103955309 A | 7/2014 |
| WO | 2013145958 A1 | 10/2013 |

OTHER PUBLICATIONS

First Chinese Office Action (including English translation) dated Sep. 21, 2016, for corresponding Chinese Application No. 201410392069.3.

Second Chinese Office Action, for Chinese Patent Application No. 201410392069.3, dated Feb. 23, 2017, 9 pages.

* cited by examiner

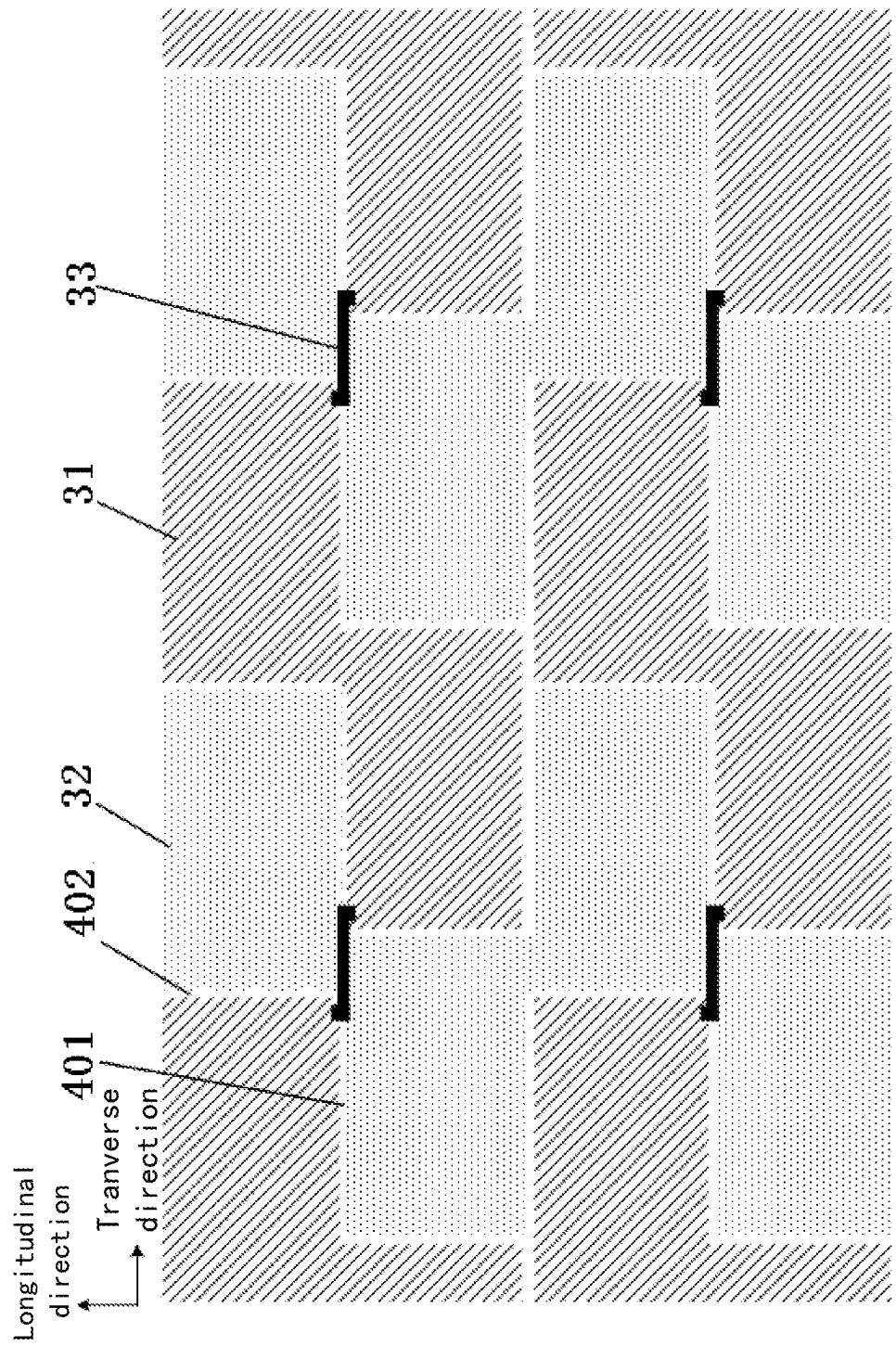

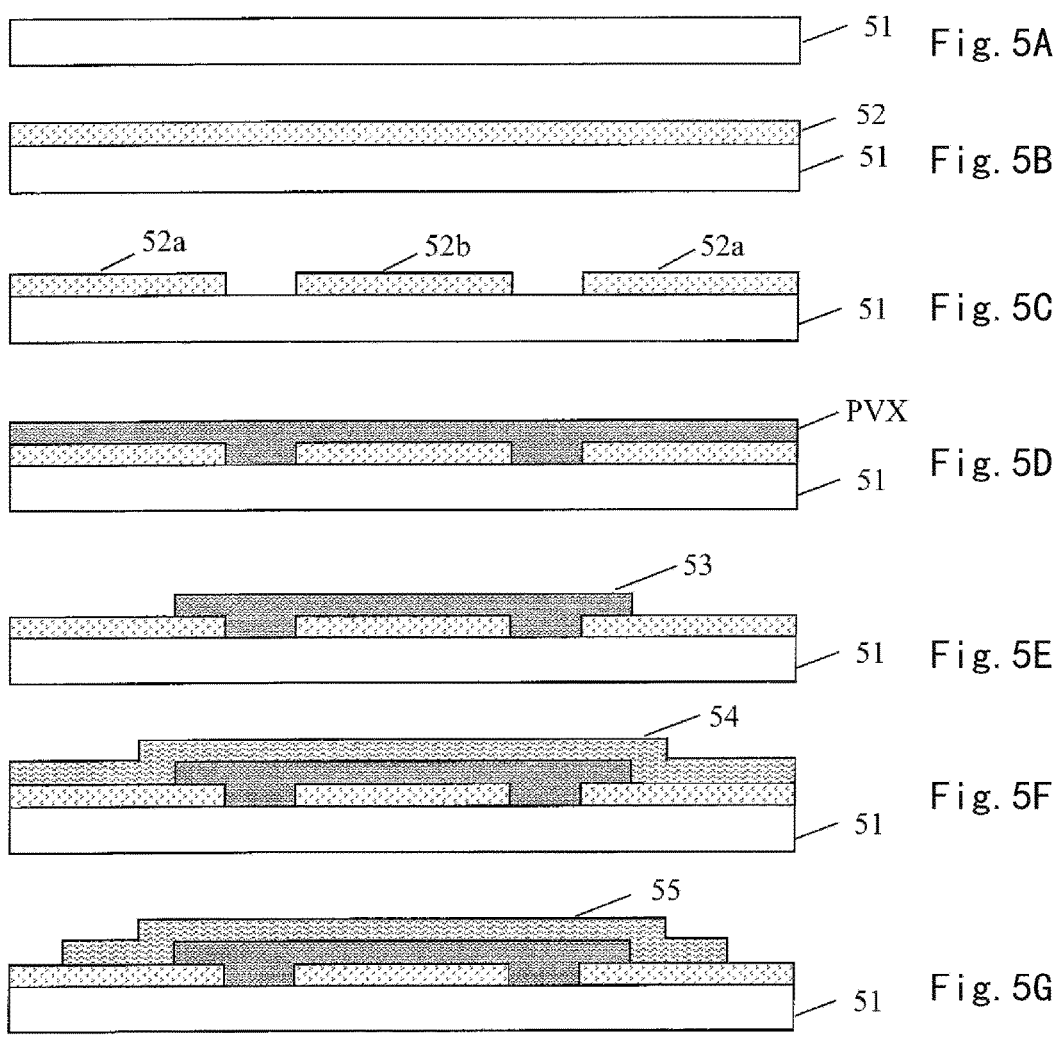

TOUCH PANEL AND METHOD OF PRODUCING THE SAME, DISPLAY APPARATUS

BACKGROUND

Field of the Disclosure

The present disclosure relates to the technical field of liquid crystal display, and in particular, to a touch panel and a method of producing the same, and a display apparatus.

Description of the Related Art

For a liquid crystal display (LCD) screen, liquid crystal molecules in a liquid crystal layer may be deflected under the effect of an electrical field between a common electrode and a pixel electrode to make the liquid crystal layer become transmissive or not transmissive to a light and the deflection amount of the liquid crystal molecules may be adjusted by controlling voltages on the pixel electrode to further control the gray scale variation of the display picture.

Typically, the common electrode and a capacitor type touch electrode are common in the LCD screen. The capacitor type touch electrode includes a driving electrode and an inductive electrode. A coupling capacitor is formed between the driving electrode and the inductive electrode. When human body contacts the touch screen, an electrical field in the human body will affect the capacitance of the coupling capacitor to change a voltage signal coupled from the inductive electrode. The driving electrode detects the variation of the voltage signal by line-by-line scanning. The inductive electrode positions the location at which the voltage signal varies to determine the touch point position.

As illustrated in FIG. 1, it is a top view of the position distribution of a rhombic touch electrode in the common electrode layer in the conventional touch panel. Taking four rhombic touch electrodes as an example, the touch electrodes in fact are arranged in a common electrode layer in array. Each row or line in the common electrode layer is provided with a plurality of rhombic touch electrodes. In FIG. 1, the four rhombic touch electrodes are arranged in the same layer. Two rhombic touch electrodes in vertical direction are inductive electrodes Rx while two rhombic touch electrodes in horizontal direction are driving electrodes Tx. Two inductive electrodes are connected directly and two driving electrodes are connected by an Indium Tin oxide (ITO) bridge 10.

Seen from FIG. 1, boundaries of the driving electrodes or inductive electrodes in the rhombic touch electrodes are crossed with and are not parallel to boundaries of the pixel units in the pixel region. As the boundaries of the rhombic touch electrodes are crossed with and are not parallel to boundaries of the pixel units in the pixel region, the change in the coupling capacitance among the rhombic touch electrodes may affect an electrical field between the pixel electrode and the common electrode to the extent to further affect the deflection of the liquid crystal molecules and to finally take adverse effects on the display quality of the LCD screen.

SUMMARY OF THE DISCLOSURE

In view of this, an essential object of the present disclosure is to provide a touch panel and a method for producing the same and a display apparatus, so as to reduce adverse effects of the change in the coupling capacitor among the rhombic ITO touch electrodes on the display quality of the LCD screen.

In accordance with an embodiment of the present invention, it provides a touch panel comprising: a first substrate, a second substrate opposed to the first substrate, a display medium layer between the first substrate and the second substrate, a black matrix arranged on one of the first substrate and the second substrate, a plurality of driving electrode units and a plurality of inductive electrode units arranged on the other one of the first substrate and the second substrate, wherein the plurality of driving electrode units and the plurality of inductive electrode units are arranged alternatively, and wherein each of the plurality of driving electrode units or the plurality of inductive electrode units includes a plurality of transparent electrodes and projections of boundaries of the transparent electrodes onto the substrate having the black matrix are covered by the black matrix or coincide with the range of the black matrix.

In the touch panel according to an embodiment, the transparent electrodes are quadrilateral transparent electrodes, which are arranged in longitudinal direction within the driving electrode unit or the inductive electrode unit, and any driving electrode unit and the inductive electrode unit adjacent to each other are arranged to be inserted into each other; and wherein the quadrilateral transparent electrodes in the driving electrode unit and the quadrilateral transparent electrodes in the inductive electrode unit are arranged alternatively in a transverse direction and insulated from each other; and in the longitudinal direction, the quadrilateral transparent electrodes in the inductive electrode unit are electrically connected in sequence, two adjacent quadrilateral transparent electrodes in the driving electrode unit are electrically connected to form a driving electrode sub-unit and two adjacent driving electrode sub-units are insulated from each other and in the transverse direction, the driving electrode sub-units are electrically connected by bridges; or the quadrilateral transparent electrodes in the driving electrode unit are electrically connected in sequence, two adjacent quadrilateral transparent electrodes in the inductive electrode unit are electrically connected to form an inductive electrode sub-unit and two adjacent inductive electrode sub-units are insulated from each other and in the transverse direction, the inductive electrode sub-units are electrically connected by bridges.

In the touch panel according to an embodiment, the black matrix is formed on the first substrate and the plurality of driving electrode units and the plurality of inductive electrode units are formed on the second substrate.

In the touch panel according to an embodiment, the first substrate is a color filter substrate, the second substrate is a thin film transistor array substrate, and the display medium layer is a liquid crystal layer.

In the touch panel according to an embodiment, the plurality of driving electrode units and the plurality of inductive electrode units are formed in the same layer of the thin film transistor array substrate, the same layer being a common electrode layer.

In the touch panel according to an embodiment, projections of boundaries of the quadrilateral transparent electrodes onto a non-common electrode layer in the thin film transistor array substrate are covered by gate lines or data lines on the thin film transistor array substrate or coincide with the range of the gate lines or data lines on the thin film transistor array substrate.

In the touch panel according to an embodiment, the quadrilateral transparent electrodes are rectangular transparent electrodes or square transparent electrodes.

In the touch panel according to an embodiment, the quadrilateral transparent electrodes are made from Indium Tin oxide materials.

In the touch panel according to an embodiment, any driving electrode unit and inductive electrode unit adjacent to each other are insulated from each other by passivation materials.

In the touch panel according to an embodiment, passivation materials are made from silicon nitride, silicon oxide, phosphorosilicate glass PSG or boron phosphorosilicate glass BPSG.

In the touch panel according to an embodiment, the bridge is made from the metal or ITO materials.

In accordance with an embodiment of another aspect of the present invention, it provides a method for producing the touch panel as described in any one of the above embodiments, the method comprises steps of producing the first substrate, the second substrate, the display medium layer between the first substrate and the second substrate, the black matrix, the plurality of driving electrode units and the plurality of inductive electrode units, wherein in the step of producing the plurality of driving electrode units and the plurality of inductive electrode units, arranging the driving electrode units and the inductive electrode units alternatively, and each of the driving electrode units and the inductive electrode units includes a plurality of transparent electrodes, and projections of boundaries of the transparent electrodes onto the substrate having the black matrix are covered by the black matrix or coincide with the range of the black matrix.

In the method according to an embodiment, the black matrix is formed on the first substrate and the plurality of driving electrode units and the plurality of inductive electrode units are formed on the second substrate, and wherein the first substrate is a color filter substrate, the second substrate is a thin film transistor array substrate, the display medium layer is a liquid crystal layer, and wherein the plurality of driving electrode units and the plurality of inductive electrode units are formed in the same layer of the thin film transistor array substrate, the same layer being a common electrode layer.

In the method according to an embodiment, the step of producing the plurality of driving electrode units and the plurality of inductive electrode units comprises:

epitaxially growing an ITO layer on the second substrate and etching the ITO layer to form the plurality of driving electrode units and the plurality of inductive electrode units;

epitaxially growing a passivation layer on the second substrate formed with the plurality of driving electrode units and the plurality of inductive electrode units and etching the passivation layer to form an insulation structure between any driving electrode unit and inductive electrode unit adjacent to each other; and epitaxially growing an ITO layer or a metal layer on the second substrate formed with the insulation structure and etching the ITO layer or the metal layer to form an ITO bridge or a metal bridge.

In the method according to an embodiment, the step of etching the passivation layer to form an insulation structure between any driving electrode unit and inductive electrode unit adjacent to each other comprises:

etching the passivation layer and forming the insulation structure between the quadrilateral transparent electrodes of the driving electrode units and the quadrilateral transparent electrodes of the inductive electrode units, in transverse direction;

etching the passivation layer and, in longitudinal direction, electrically connecting the quadrilateral transparent electrodes of the inductive electrode units in sequence, electrically connecting two adjacent quadrilateral transparent electrodes of the driving electrode units to form a driving electrode sub-unit and forming the insulation structure between two adjacent driving electrode sub-units, or electrically connecting the quadrilateral transparent electrodes of the driving electrode units in sequence, electrically connecting two adjacent quadrilateral transparent electrodes of the inductive electrode units to form an inductive electrode sub-unit and forming the insulation structure between two adjacent inductive electrode sub-units.

In the method according to an embodiment, the step of etching the ITO layer or the metal layer to form an ITO bridge or a metal bridge comprises:

in longitudinal direction, electrically connecting the quadrilateral transparent electrodes of the inductive electrode units in sequence, electrically connecting two adjacent quadrilateral transparent electrodes of the driving electrode units to form a driving electrode sub-unit and insulating two adjacent driving electrode sub-units from each other and etching the ITO layer or the metal layer to form an ITO bridge or a metal bridge among the driving electrode sub-units in transverse direction, or electrically connecting the quadrilateral transparent electrodes of the driving electrode units in sequence, electrically connecting two adjacent quadrilateral transparent electrodes of the inductive electrode units to form an inductive electrode sub-unit and insulating two adjacent driving electrode sub-units from each other and etching the ITO layer or the metal layer to form an ITO bridge or a metal bridge among the inductive electrode sub-units in transverse direction.

In accordance with an embodiment of a further aspect of the present invention, it provides a display apparatus comprising the touch panel described in any one of the above embodiments.

In the touch panel and the method for producing the same and the display apparatus provided by embodiments of the present invention, a plurality of driving electrode units and a plurality of inductive electrode units arranged in the same layer of the TFT array substrate include a plurality of transparent electrodes and projections of boundaries of the transparent electrodes onto the CF substrate are covered by the black matrix or coincide with the range of the black matrix on the CF substrate, such that the boundaries of the transparent electrodes are shielded by the black matrix on the CF substrate. When the human body contacts with the touch screen to generate a touch signal, the black matrix on the CF substrate can prevent the change in the coupling capacitance among the touch electrodes from affecting an electrical field between the pixel electrode and the common electrode. In this way, the effects on deflection of the liquid crystal molecules due to the change in the coupling capacitance among the touch electrodes are avoided. Thereby, the poor display effects of the LCD screen are avoided to optimize and enhance the display quality of the LCD screen.

BRIEF DESCRIPTION OF THE DRAWINGS

FIG. 3A is a top view of the position distribution of the touch electrodes in the common electrode layer in a touch panel according to an embodiment of the present invention, in which gate lines and data lines are not shown.

FIGS. 5A-5G are flow charts of process for producing the plurality of driving electrode units and the plurality of inductive electrode units in the TFT array substrate shown in FIGS. 3, 3A and 4, according to an embodiment of the present invention.

DETAILED DESCRIPTION OF THE PREFERRED EMBODIMENTS

In order that objects, solutions and advantages of the present disclosure will become more apparent and explicit, the embodiments of the present disclosure will be described hereinafter in detail with reference to the accompanied drawings.

An embodiment of the present invention provides a touch panel and a method for producing the same, for reducing adverse effects of the coupling capacitance among the rhombic ITO touch electrodes on the display quality of the LCD screen.

Such touch panel provided by an embodiment of the present invention is a touch display screen produced by integrating a capacitor type touch screen to a display screen. The capacitor type touch screen is embedded in the display screen. The capacitor type touch screen and the display screen are produced together. Such arrangement of the touch display screen not only may reduce the thickness of the touch display screen efficiently, but also may reduce the difficulty in producing the touch display screen so as to save costs. However, the touch panel structure provided by the embodiment of the present invention is not limited to an in-cell capacitor type touch screen, but may also be used in an add-on capacitor type touch screen.

The structure of the touch display screen produced by integrating the capacitor type touch screen into the display screen as described above will be explained briefly below. As illustrated in FIG. 2, it is a cross sectional view showing the position distribution of the conventional rhombic touch electrode in a touch display screen. A TFT array substrate 20, a liquid crystal layer 21 and a color filter (CF) substrate 22 are stacked in sequence from bottom to top. A thin film transistor (TFT) array substrate 20 has a common electrode layer formed by an ITO transparent electrode 201 and a plurality of gate lines and data lines 202 arranged in transverse direction. The ITO transparent electrode 201 corresponds to the rhombic touch electrode shown in FIG. 1. The positions of the gate lines and the data lines 202 correspond to the position of the black matrix BM in the CF substrate 22.

Figure 1:
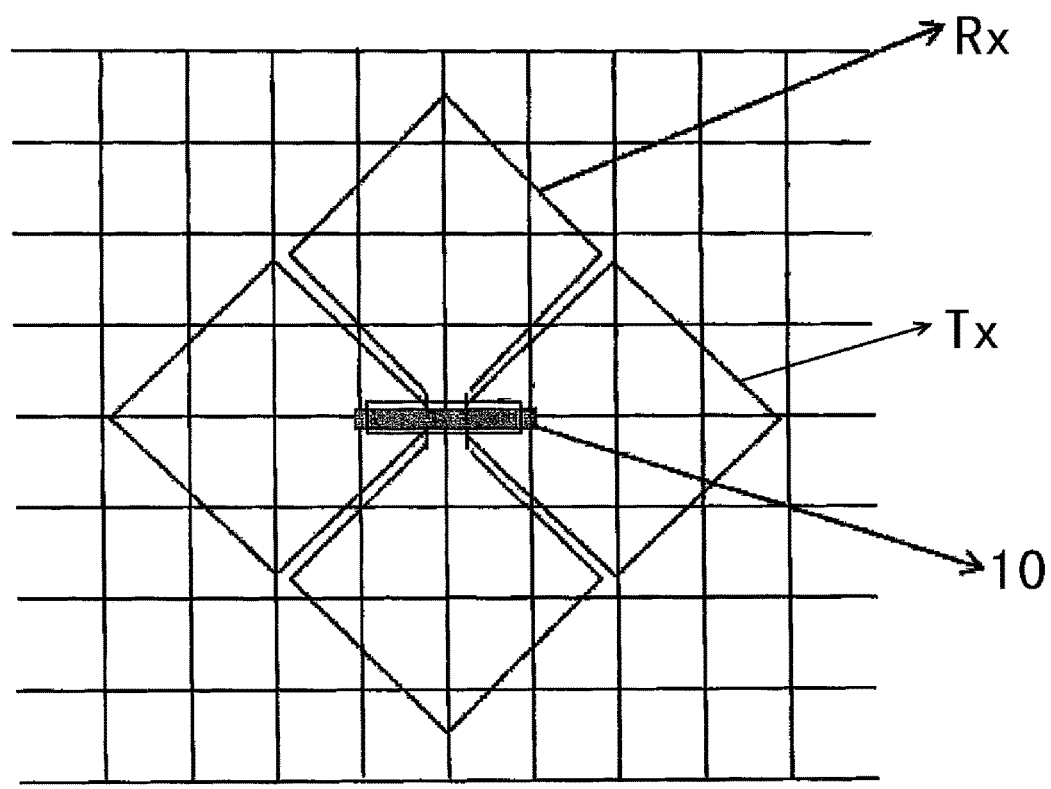
FIG. 1 is a top view of the position distribution of a rhombic touch electrode in the common electrode layer in the conventional touch panel.
Figure 2:
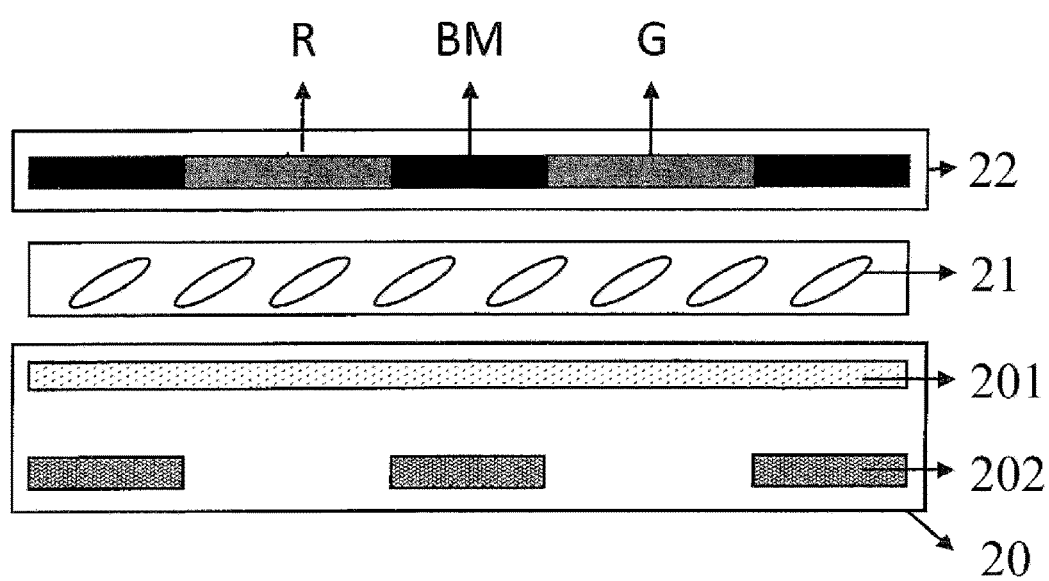
FIG. 2 is a cross sectional view showing the position distribution of the conventional rhombic touch electrode in a touch display screen.
Figure 3:
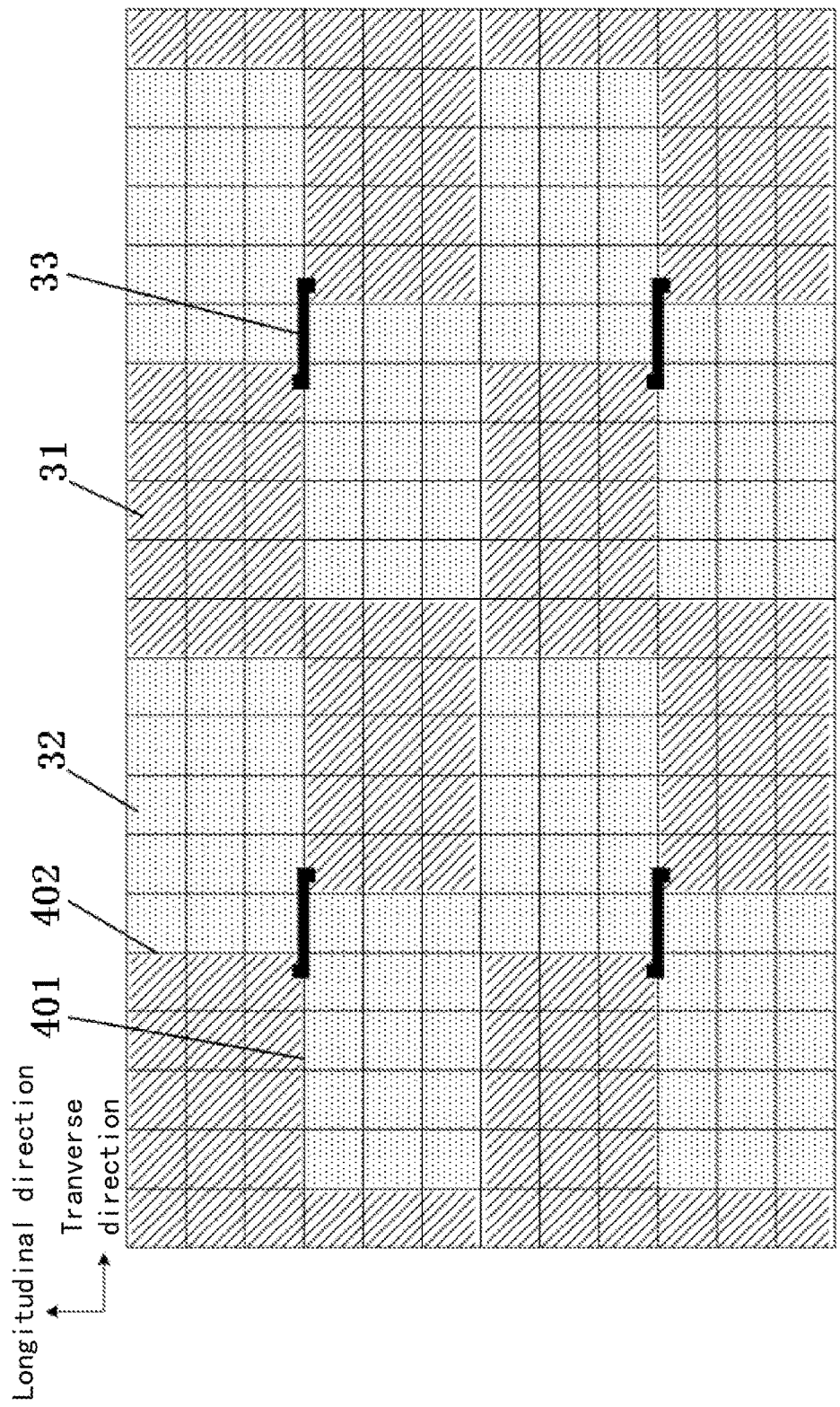
FIG. 3 is a top view of the position distribution of the touch electrodes in the common electrode layer in a touch panel according to an embodiment of the present invention, in which gate lines and data lines are shown.
Figure 4:
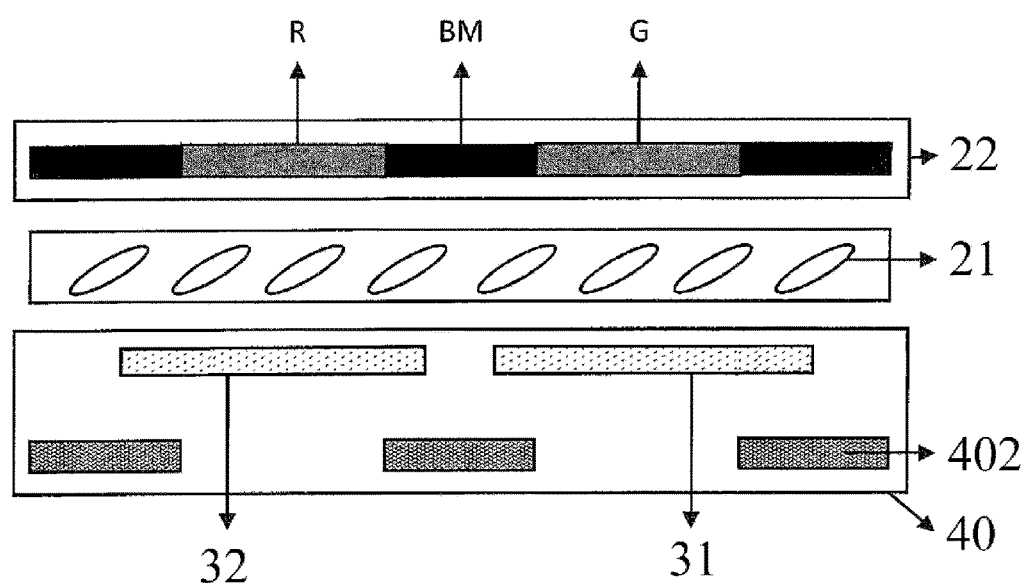
FIG. 4 is a cross sectional view of the position distribution of the touch electrode according to an embodiment of the present invention, in the touch panel.

In the touch panel provided by the embodiment of the present invention, the transparent electrode is different from the rhombic touch electrodes shown in FIGS. 1 and 2. Their specific structure may be shown in FIGS. 3, 3A and 4. FIGS. 3 and 3A are both top views of the position distribution of the touch electrodes in the common electrode layer in a touch panel according to an embodiment of the present invention. In FIG. 3, gate lines and data lines are shown. In FIG. 3A, the gate lines and the data lines are not shown. FIG. 4 is a cross sectional view of the position distribution of the touch electrode according to an embodiment of the present invention, in the touch panel. The touch panel according to the embodiments of the present invention will be explained in details with reference to FIGS. 3, 3A and 4.

As illustrated in FIGS. 3, 3A and 4, an embodiment of the present invention provides a touch panel. The touch panel includes: a first substrate, a second substrate, a display medium layer between the first substrate and the second substrate, a black matrix (BM), a plurality of driving electrode units 31 and a plurality of inductive electrode units 32 arranged alternatively. Each of the plurality of driving electrode units 31 or the plurality of inductive electrode units 32 includes a plurality of transparent electrodes and projections of boundaries of the transparent electrodes onto the substrate having the black matrix (BM) are covered by the black matrix or coincide with the range of the black matrix (BM).

In the embodiment, the black matrix (BM) is formed on the first substrate and the plurality of driving electrode units and the plurality of inductive electrode units are formed on the second substrate. The first substrate is a CF substrate 22, and the second substrate is a TFT array substrate 40, and the display medium layer is a liquid crystal layer 21. The plurality of driving electrode units 31 and the plurality of inductive electrode units 32 are formed in the same layer of the TFT array substrate 40, that is, they are formed in a common electrode layer on the TFT array substrate 40.

In the embodiment, the transparent electrodes are quadrilateral transparent electrodes, as illustrated in FIGS. 3 and 3A. The quadrilateral transparent electrodes are arranged in longitudinal direction within any one of the driving electrode units or the inductive electrode units. The quadrilateral transparent electrodes have boundaries parallel to the boundaries of the pixel units in the pixel region on the TFT array substrate. Any driving electrode unit and the inductive electrode unit adjacent to each other are arranged to be inserted into each other. That is, a part of a driving electrode unit extends into between two adjacent inductive electrode units in longitudinal direction, or a part of an inductive electrode unit extends into between two adjacent driving electrode units in longitudinal direction. In transverse direction, the quadrilateral transparent electrodes in the driving electrode unit and the quadrilateral transparent electrodes in the inductive electrode unit are arranged alternatively and insulated from each other. In the longitudinal direction, the quadrilateral transparent electrodes in the inductive electrode unit are electrically connected in sequence, two adjacent quadrilateral transparent electrodes in the driving electrode unit are electrically connected to form a driving electrode sub-unit and two adjacent driving electrode sub-units are insulated from each other. In the transverse direction, the driving electrode sub-units are electrically connected by bridges 33. Or, the quadrilateral transparent electrodes in the driving electrode unit are electrically connected in sequence, two adjacent quadrilateral transparent electrodes in the inductive electrode unit are electrically connected to form an inductive electrode sub-unit and two adjacent inductive electrode sub-units are insulated from each other and in the transverse direction, the inductive electrode sub-units are electrically connected by bridges 33.

In the touch panel according to an embodiment of the present invention, projections of boundaries of the quadrilateral transparent electrodes onto the CF substrate 22 are covered by the black matrix BM on the CF substrate 22 or coincide with the range of the black matrix BM on the CF substrate 22 such that the boundaries of these quadrilateral transparent electrodes are shielded by the black matrix BM on the CF substrate 22. When the human body contacts with the touch screen to generate a touch signal, the black matrix BM on the CF substrate 22 can prevent the change in the coupling capacitance between the driving electrode units 31 and the inductive electrode units 32 formed by these quadrilateral transparent electrodes from affecting an electrical field between the pixel electrode and the common electrode. In this way, the effects on deflection of the liquid crystal molecules due to the change in the coupling capacitance between the driving electrode units 31 and the inductive electrode units 32 are avoided. Thereby, the poor display effects of the LCD screen are avoided to optimize and enhance the display quality of the LCD screen.

It should be noted that, in the embodiments shown in FIGS. 3, 3A and 4, all of driving electrode sub-units in the driving electrode unit 31 are electrically connected in transverse direction by bridges. In this case, two adjacent inductive electrode units 32 are not connected to each other. In practice, the positions of the driving electrode units and the inductive electrode units may be interchanged, i.e., in an alternative embodiment, all of inductive electrode sub-units in the inductive electrode unit 32 are electrically connected in transverse direction by bridges. In this case, two adjacent driving electrode units 31 are not connected to each other.

In an embodiment, as illustrated in FIG. 4, projections of boundaries of the quadrilateral transparent electrodes onto a non-common electrode layer in the thin film transistor array substrate 40 are covered by gate lines or data lines on the thin film transistor array substrate 40 or coincide with the range of the gate lines 401 (FIG. 3) or data lines 402 on the thin film transistor array substrate.

In an embodiment, the quadrilateral transparent electrodes are rectangular transparent electrodes or square transparent electrodes. The quadrilateral transparent electrodes are made from Indium Tin oxide materials.

In an embodiment, any driving electrode unit and inductive electrode unit adjacent to each other are insulated from each other by passivation materials. The passivation materials may be made from silicon nitride, silicon oxide, phosphorosilicate glass or boron phosphorosilicate glass. However, embodiments of the present invention are not limited to this.

In an embodiment, the bridge 33 between two adjacent driving electrode units 31 or inductive electrode units 32 is made from the metal or ITO materials. It is used to achieve the electrical connection between two adjacent driving electrode units 31 or two adjacent inductive electrode units 32.

The following paragraphs will explain how the touch panel provided by the embodiment of the present invention can suppress the adverse effects of the change in the coupling capacitance among the rhombic ITO touch electrodes on the display quality of the LCD screen.

With reference to FIGS. 3, 3A and 4, the touch panel provided by the embodiment of the present invention includes a TFT array substrate. The TFT array substrate 40 includes a plurality of driving electrode units 31 and a plurality of inductive electrode units 32 arranged along transverse direction. These driving electrode units 31 and inductive electrode units 32 are arranged in the same layer, for example, in the common electrode layer on the TFT array substrate 40. Each of the plurality of driving electrode units 31 or the plurality of inductive electrode units 32 includes a plurality of quadrilateral transparent electrodes and boundaries of the quadrilateral transparent electrodes in longitudinal direction are arranged such that projections of them onto the CF substrate 22 are covered by the black matrix on the CF substrate 22 or coincide with the range of the black matrix on the CF substrate 22. Or, projections of boundaries of the quadrilateral transparent electrodes onto non-common electrode layer on the TFT array substrate 40 are covered by the gate lines or data lines on the TFT array substrate 40 or coincide with the range of the gate lines 401 or data lines 402 on the TFT array substrate 40. As the positions of the gate lines 401 or data lines 402 on the TFT array substrate 40 correspond to the positions of the black matrix BM on the CF substrate 22, projections of boundaries of these quadrilateral transparent electrodes onto the CF substrate 22 are covered by the black matrix BM on the CF substrate or coincide with the range of the black matrix BM on the CF substrate such that the projections of these quadrilateral transparent electrodes are shielded by the black matrix BM on the CF substrate 22. When the human body contacts with the touch screen to generate a touch signal, the black matrix BM on the CF substrate 22 can prevent the change in the coupling capacitance between the driving electrode units 31 and the inductive electrode units 32 formed by these quadrilateral transparent electrodes from affecting an electrical field between the pixel electrode and the common electrode. In this way, the effects on deflection of the liquid crystal molecules due to the change in the coupling capacitance between the driving electrode units 31 and the inductive electrode units 32 are avoided. Thereby, the poor display effects of the LCD screen are avoided to optimize and enhance the display quality of the LCD screen.

According to a further embodiment of the present invention, it provides a display apparatus comprising the touch panel as described in any one of the above embodiments. The display apparatus may be any product or component having a display function such as a cell phone, a tablet computer, a TV, a display, a notebook computer, a digital camera frame, a navigator or an electronic paper.

In a further embodiment of the present invention, with reference to FIGS. 3, 3A and 4, it also provides a method for producing the touch panel as shown in FIGS. 3, 3A and 4. The method includes steps of producing the first substrate, the second substrate, the display medium layer between the first substrate and the second substrate, the black matrix, the plurality of driving electrode units and the plurality of inductive electrode units. In the step of producing the plurality of driving electrode units and the plurality of inductive electrode units, arranging the driving electrode units and the inductive electrode units alternatively, and each of the driving electrode units and the inductive electrode units includes a plurality of transparent electrodes, and projections of boundaries of the transparent electrodes onto the substrate having the black matrix are covered by the black matrix or coincide with the range of the black matrix.

In an embodiment, the black matrix is formed on the first substrate and the plurality of driving electrode units and the plurality of inductive electrode units are formed on the second substrate. The first substrate is a CF substrate. The second substrate is a TFT array substrate. The display medium layer is a liquid crystal layer. The plurality of driving electrode units and the plurality of inductive electrode units are formed in the same layer of the thin film transistor array substrate, the same layer being a common electrode layer.

In the example, the steps of producing the CF substrate, the TFT array substrate, the display medium layer between the CF substrate and the TFT array substrate and the black matrix BM located on the CF substrate are performed by the processes in the art. The specific explanations to them will be omitted herein. The step of producing the plurality of driving electrode units and the plurality of inductive electrode units includes:

Step 10: epitaxially growing an ITO layer on the second substrate and etching the ITO layer to form the plurality of driving electrode units and the plurality of inductive electrode units;

Step 20: epitaxially growing a passivation layer on the thin film transistor array substrate formed with the plurality of driving electrode units and the plurality of inductive electrode units and etching the passivation layer to form an insulation structure between any driving electrode unit and inductive electrode unit adjacent to each other; and Step 30: epitaxially growing an ITO layer or a metal layer on the thin film transistor array substrate formed with the insulation structure and etching the ITO layer or the metal layer to form an ITO bridge or a metal bridge.

In an embodiment, in the Step 20, the step of etching the passivation layer to form an insulation structure between any driving electrode unit and inductive electrode unit adjacent to each other includes:

etching the passivation layer and forming the insulation structure between the quadrilateral transparent electrodes of the driving electrode units and the quadrilateral transparent electrodes of the inductive electrode units, in transverse direction; and etching the passivation layer and, in longitudinal direction, electrically connecting the quadrilateral transparent electrodes of the inductive electrode units in sequence, electrically connecting two adjacent quadrilateral transparent electrodes of the driving electrode units to form a driving electrode sub-unit and forming the insulation structure between two adjacent driving electrode sub-units, or electrically connecting the quadrilateral transparent electrodes of the driving electrode units in sequence, electrically connecting two adjacent quadrilateral transparent electrodes of the inductive electrode units to form an inductive electrode sub-unit and forming the insulation structure between two adjacent inductive electrode sub-units.

In an embodiment, in the Step 30, the step of etching the ITO layer or the metal layer to form an ITO bridge or a metal bridge includes:

in longitudinal direction, electrically connecting the quadrilateral transparent electrodes of the inductive electrode units in sequence, electrically connecting two adjacent quadrilateral transparent electrodes of the driving electrode units to form a driving electrode sub-unit and insulating two adjacent driving electrode sub-units from each other and etching the ITO layer or the metal layer to form an ITO bridge or a metal bridge among the driving electrode sub-units in transverse direction, or electrically connecting the quadrilateral transparent electrodes of the driving electrode units in sequence, electrically connecting two adjacent quadrilateral transparent electrodes of the inductive electrode units to form an inductive electrode sub-unit and insulating two adjacent driving electrode sub-units from each other and etching the ITO layer or the metal layer to form an ITO bridge or a metal bridge among the inductive electrode sub-units in transverse direction.

The steps for producing the plurality of driving electrode units and the plurality of inductive electrode units located on the TFT array substrate will be explained below with reference to FIGS. 5A to 5G.

As illustrated in FIGS. 5A to 5G, they are flow charts of process for producing the plurality of driving electrode units and the plurality of inductive electrode units located on the TFT array substrate shown in FIGS. 3, 3A and 4 according to an embodiment of the present invention. The process includes the following steps:

producing a substrate 51 from such as glass or resin material, as illustrated in FIG. 5A;

epitaxially growing an ITO layer 52 on the substrate 51, as illustrated in FIG. 5B;

etching the ITO layer 52 to form a plurality of driving electrode units 52a and a plurality of inductive electrode units 52b arranged alternatively in transverse direction, as illustrated in FIG. 5C;

epitaxially growing a passivation layer (PVX) on the substrate 51 formed with the plurality of driving electrode units 52a and the plurality of inductive electrode units 52b, as illustrated in FIG. 5D;

etching the passivation layer to form an insulation structure 53 between any driving electrode unit and inductive electrode unit adjacent to each other, as illustrated in FIG. 5E;

epitaxially growing an ITO layer or a metal layer 54 on the substrate 51 formed with the insulation structure 53, as illustrated in FIG. 5F;

etching the ITO layer or the metal layer 54 to form the ITO bridge or metal bridge 55 between two adjacent driving electrode units 52a, as illustrated in FIG. 5G.

In the above embodiment, the ITO bridge or the metal bridge 55 is formed between two adjacent driving electrode units 52a to achieve electrical connection. In practice, as the positions of the driving electrode units and the inductive electrode units may be interchanged, in other embodiments, the ITO bridge or the metal bridge 55 may also be formed between two adjacent inductive electrode units 52b. Its process is similar to the above embodiments. The specific explanations to it will be omitted herein.

It can be seen from the above embodiments that in the touch panel and the method for producing the same and the display apparatus provided by the embodiment of the present invention, by means of patterning design on the quadrilateral transparent electrodes constituting the driving electrode units and the inductive electrode units in the common electrode layer, projections of boundaries of these quadrilateral transparent electrodes onto the CF substrate are covered by the black matrix BM on the CF substrate or coincide with the range of the black matrix BM on the CF substrate such that the projections of these quadrilateral transparent electrodes are shielded by the black matrix BM on the CF substrate. When the human body contacts with the touch screen to generate a touch signal, the black matrix BM on the CF substrate can prevent the change in the coupling capacitance between the driving electrode units and the inductive electrode units formed by these quadrilateral transparent electrodes from affecting an electrical field between the pixel electrode and the common electrode. In this way, the effects on deflection of the liquid crystal molecules due to the change in the coupling capacitance between the driving electrode units and the inductive electrode units are avoided. Thereby, the poor display effects of the LCD screen are avoided to optimize and enhance the display quality of the LCD screen.

The objects, solutions and advantageous effects of the present disclosure have been described in details with reference to the above specific embodiments. It should be understood that the above embodiments are given only by ways of examples instead of limiting the present disclosure. Any changes, equivalent replacement, modification within the spirit and principles of the disclosure can be made by those skilled in the art and should fall within the scope of the present disclosure.

What is claimed is:

1. A touch panel comprising:
a first substrate including a black matrix,
a second substrate opposed to the first substrate, including a plurality of driving electrode units and a plurality of inductive electrode units;
a display medium layer between the first substrate and the second substrate,
wherein the plurality of driving electrode units and the plurality of inductive electrode units are arranged alternatively, and
wherein each of the plurality of driving electrode units or the plurality of inductive electrode units includes a plurality of transparent electrodes, and wherein the plurality of transparent electrodes are quadrilateral transparent electrodes, and wherein the quadrilateral transparent electrodes are arranged so that each edge of each of the transparent electrodes are parallel to directions along which pixel units are arranged in the second substrate, and
wherein projections of boundaries of the quadrilateral transparent electrodes onto the first substrate are covered by the black matrix or coincide with the range of the black matrix.

2. The touch panel according to claim 1, wherein any driving electrode unit and the inductive electrode unit adjacent to each other are arranged to be inserted into each other; and wherein
the quadrilateral transparent electrodes in the driving electrode unit and the quadrilateral transparent electrodes in the inductive electrode unit are arranged alternatively in a transverse direction and insulated from each other; and
in the longitudinal direction, the quadrilateral transparent electrodes in the inductive electrode unit are electrically connected in sequence, two adjacent quadrilateral transparent electrodes in the driving electrode unit are electrically connected to form a driving electrode sub-unit and two adjacent driving electrode sub-units are insulated from each other and in the transverse direction, the driving electrode sub-units are electrically connected by bridges; or
the quadrilateral transparent electrodes in the driving electrode unit are electrically connected in sequence, two adjacent quadrilateral transparent electrodes in the inductive electrode unit are electrically connected to form an inductive electrode sub-unit and two adjacent inductive electrode sub-units are insulated from each other and in the transverse direction, the inductive electrode sub-units are electrically connected by bridges.

3. The touch panel according to claim 2, wherein the quadrilateral transparent electrodes are made from Indium Tin oxide materials.

4. The touch panel according to claim 2, wherein any driving electrode unit and inductive electrode unit adjacent to each other are insulated from each other by passivation materials.

5. The touch panel according to claim 4, wherein the passivation materials are made from silicon nitride, silicon oxide, phosphorosilicate glass PSG or boron phosphorosilicate glass BPSG.

6. The touch panel according to claim 2, wherein each bridge is made from metal or Indium Tin oxide (ITO) materials.

7. The touch panel according to claim 1, wherein the first substrate is a color filter substrate, the second substrate is a thin film transistor array substrate, and the display medium layer is a liquid crystal layer.

8. The touch panel according to claim 7, wherein the plurality of driving electrode units and the plurality of inductive electrode units are formed in the same layer of the thin film transistor array substrate, the same layer being a common electrode layer.

9. The touch panel according to claim 7, wherein projections of boundaries of the transparent electrodes onto a non-common electrode layer in the thin film transistor array substrate are covered by gate lines or data lines on the thin film transistor array substrate or coincide with the range of the gate lines or data lines on the thin film transistor array substrate.

10. The touch panel according to claim 1, wherein the quadrilateral transparent electrodes are rectangular transparent electrodes or square transparent electrodes.

11. The touch panel according to claim 10, wherein the quadrilateral transparent electrodes are made from Indium Tin oxide materials.

12. A method for producing the touch panel according to claim 1, the method comprising steps of producing the first substrate, the second substrate, the display medium layer between the first substrate and the second substrate, the black matrix, the plurality of driving electrode units and the plurality of inductive electrode units,
wherein in the step of producing the plurality of driving electrode units and the plurality of inductive electrode units, arranging the driving electrode units and the inductive electrode units alternatively, and each of the driving electrode units and the inductive electrode units includes a plurality of transparent electrodes, and projections of boundaries of the transparent electrodes onto the first substrate are covered by the black matrix or coincide with the range of the black matrix.

13. The method according to claim 12, wherein wherein the first substrate is a color filter substrate, the second substrate is a thin film transistor array substrate, the display medium layer is a liquid crystal layer, and wherein the plurality of driving electrode units and the plurality of inductive electrode units are formed in the same layer of the thin film transistor array substrate, the same layer being a common electrode layer.

14. The method according to claim 13, wherein the step of producing the plurality of driving electrode units and the plurality of inductive electrode units comprises:
epitaxially growing an Indium Tin oxide (ITO) layer on the second substrate and etching the ITO layer to form the plurality of driving electrode units and the plurality of inductive electrode units;
epitaxially growing a passivation layer on the second substrate formed with the plurality of driving electrode units and the plurality of inductive electrode units and etching the passivation layer to form an insulation structure between any driving electrode unit and inductive electrode unit adjacent to each other; and
epitaxially growing an ITO layer or a metal layer on the second substrate formed with the insulation structure and etching the ITO layer or the metal layer to form an ITO bridge or a metal bridge.

15. The method according to claim 14, wherein the step of etching the passivation layer to form an insulation structure between any driving electrode unit and inductive electrode unit adjacent to each other comprises:

etching the passivation layer and forming the insulation structure between the quadrilateral transparent electrodes of the driving electrode units and the quadrilateral transparent electrodes of the inductive electrode units, in transverse direction;

etching the passivation layer and, in longitudinal direction, electrically connecting the quadrilateral transparent electrodes of the inductive electrode units in sequence, electrically connecting two adjacent quadrilateral transparent electrodes of the driving electrode units to form a driving electrode sub-unit and forming the insulation structure between two adjacent driving electrode sub-units, or electrically connecting the quadrilateral transparent electrodes of the driving electrode units in sequence, electrically connecting two adjacent quadrilateral transparent electrodes of the inductive electrode units to form an inductive electrode sub-unit and forming the insulation structure between two adjacent inductive electrode sub-units.

16. The method according to claim 14, wherein the step of etching the ITO layer or the metal layer to form an ITO bridge or a metal bridge comprises:

in longitudinal direction, electrically connecting the quadrilateral transparent electrodes of the inductive electrode units in sequence, electrically connecting two adjacent quadrilateral transparent electrodes of the driving electrode units to form a driving electrode sub-unit and insulating two adjacent driving electrode sub-units from each other and etching the ITO layer or the metal layer to form an ITO bridge or a metal bridge among the driving electrode sub-units in transverse direction, or electrically connecting the quadrilateral transparent electrodes of the driving electrode units in sequence, electrically connecting two adjacent quadrilateral transparent electrodes of the inductive electrode units to form an inductive electrode sub-unit and insulating two adjacent driving electrode sub-units from each other and etching the ITO layer or the metal layer to form an ITO bridge or a metal bridge among the inductive electrode sub-units in transverse direction.

17. A display apparatus comprising the touch panel according to claim 1.

* * * * *